(12) United States Patent
Miyashiro et al.

(10) Patent No.: US 11,473,353 B2
(45) Date of Patent: Oct. 18, 2022

(54) VEHICLE DOOR APPARATUS TO RESTRICT OPENING OF A DOOR

(71) Applicant: AISIN CORPORATION, Aichi (JP)

(72) Inventors: Ryu Miyashiro, Aichi-gun (JP); Takuro Oshida, Anjo (JP)

(73) Assignee: AISIN CORPORATION, Kariya (JP)

( * ) Notice: Subject to any disclaimer, the term of this patent is extended or adjusted under 35 U.S.C. 154(b) by 858 days.

(21) Appl. No.: 16/340,926

(22) PCT Filed: Sep. 5, 2017

(86) PCT No.: PCT/JP2017/031977
§ 371 (c)(1),
(2) Date: Apr. 10, 2019

(87) PCT Pub. No.: WO2018/079084
PCT Pub. Date: May 3, 2018

(65) Prior Publication Data
US 2019/0284851 A1    Sep. 19, 2019

(30) Foreign Application Priority Data

Oct. 24, 2016    (JP) .............................. JP2016-208124

(51) Int. Cl.
*G08B 21/00* (2006.01)
*E05C 17/00* (2006.01)
(Continued)

(52) U.S. Cl.
CPC ............... *E05C 17/006* (2013.01); *B60J 5/00* (2013.01); *E05F 15/73* (2015.01);
(Continued)

(58) Field of Classification Search
CPC . E05C 17/006; B60J 5/00; E05F 15/73; E05F 2015/483; E05F 2015/763;
(Continued)

(56) References Cited

U.S. PATENT DOCUMENTS

| | | | |
|---|---|---|---|
| 9,637,965 B1* | 5/2017 | Kothari | ................... E05F 15/40 |
| 2005/0085972 A1* | 4/2005 | Martinez | ................. E05C 17/00 |
| | | | 701/49 |

(Continued)

FOREIGN PATENT DOCUMENTS

| | | |
|---|---|---|
| CN | 104442664 A | 3/2015 |
| CN | 204210378 U | 3/2015 |

(Continued)

OTHER PUBLICATIONS

Combined Chinese Office Action and Search Report dated Oct. 18, 2021 in Chinese Patent Application No. 201780064508.X (with English translation), citing document AO therein, 12 pages.

(Continued)

*Primary Examiner* — Mark S Rushing

(74) *Attorney, Agent, or Firm* — Oblon, McClelland, Maier & Neustadt, L.L.P.

(57) ABSTRACT

A vehicle door apparatus includes: a moving object detector configured to detect a moving object approaching a door of a vehicle; a door opening operation detector configured to detect a door opening operation performed by an occupant in the vehicle; a door opening restriction unit configured to restrict opening of the door by the door opening operation when detecting approach of the moving object; and a door opening permission unit configured to permit opening of the door by the door opening operation when the door opening operation is detected a predetermined number of times in a state in which the opening of the door is restricted.

5 Claims, 6 Drawing Sheets

(51) Int. Cl.
    *E05F 15/73*     (2015.01)
    *B60J 5/00*     (2006.01)
    *E05F 15/42*     (2015.01)

(52) U.S. Cl.
    CPC ... *E05F 2015/483* (2015.01); *E05F 2015/763* (2015.01); *E05Y 2400/532* (2013.01); *E05Y 2900/531* (2013.01)

(58) Field of Classification Search
    CPC ......... E05Y 2400/532; E05Y 2900/531; E05Y 2400/81; E05Y 2400/814; E05Y 2400/82
    USPC ....................................................... 340/436
    See application file for complete search history.

(56) References Cited

U.S. PATENT DOCUMENTS

| | | | | |
|---|---|---|---|---|
| 2014/0257630 | A1* | 9/2014 | Ruiz | E05B 77/54 |
| | | | | 701/36 |
| 2017/0030136 | A1* | 2/2017 | Ihlenburg | E05F 15/40 |
| 2019/0024430 | A1* | 1/2019 | Jeromin | G06V 20/58 |

FOREIGN PATENT DOCUMENTS

| | | |
|---|---|---|
| JP | 4-62283 A | 2/1992 |
| JP | 2009-40342 A | 2/2009 |
| JP | 2009-41209 A | 2/2009 |
| JP | 2010-158990 A | 7/2010 |
| JP | 2015-209657 A | 11/2015 |

OTHER PUBLICATIONS

International Search Report dated Nov. 28, 2017 in PCT/JP2017/031977 filed Sep. 5, 2017.

Decision of Refusal dated Aug. 11, 2020 in Japanese Patent Application No. 2016-208124 (with English machine translation), citing document AO therein, 4 pages.

Combined Chinese Office Action and Search Report dated Feb. 28, 2022 in Chinese Patent Application No. 201780064508.X (with English translation), citing document AO therein, 13 pages.

* cited by examiner

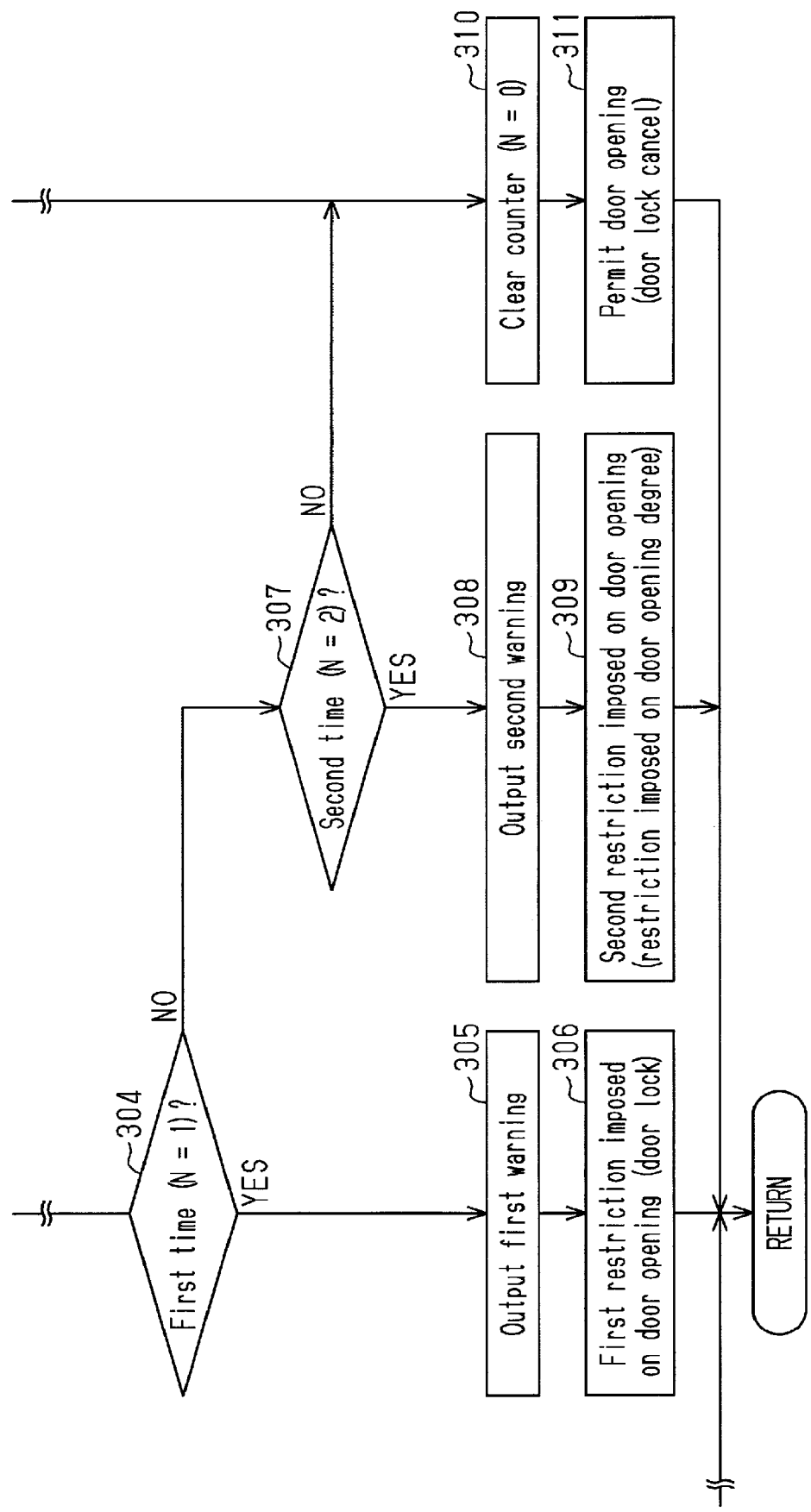

VEHICLE DOOR APPARATUS TO RESTRICT OPENING OF A DOOR

TECHNICAL FIELD

The present invention relates to a vehicle door apparatus.

BACKGROUND ART

Patent Document 1 describes an example of a conventional vehicle door apparatus that monitors the surroundings of a vehicle and restricts opening of a door when detecting a moving object such as another vehicle or a motorcycle approaching the door from behind the vehicle in order to avoid contact with the moving object. Patent Document 2 describes a door apparatus that executes further sophisticated door opening restriction control by using two types of monitoring sensors, which have different detection ranges, and a navigation system to determine a parking position. Patent Document 3 discloses a door apparatus that stores a credibility status for each user who will be an occupant of a vehicle. The credibility status indicates whether the occupant is one who is safety-conscious and can confirm safety when opening a door from inside the vehicle. This repeatedly urges an occupant who is not safety-conscious to be careful.

PRIOR ART DOCUMENT

Patent Documents

Patent Document 1: Japanese Laid-Open Patent Publication No. 4-62283
Patent Document 2: Japanese Laid-Open Patent Publication No. 2009-41209
Patent Document 3: Japanese Laid-Open Patent Publication No. 2009-40342

SUMMARY OF THE INVENTION

Problems That the Invention is to Solve

When a vehicle pulls over on a busy road, other vehicles constantly pass beside the door. In such a state, the door may not open when the above opening restriction is performed. In such a case, with the conventional technique, the door will have to be forced open by ignoring the opening restriction. In this respect, there is still room for improvement.

It is an object of the present invention to provide a vehicle door apparatus having further superior convenience while ensuring a high level of safety. Means for solving the problems A vehicle door apparatus that achieves the above object preferably includes a moving object detector configured to detect a moving object approaching a door of a vehicle; a door opening operation detector configured to detect a door opening operation performed by an occupant in the vehicle; a door opening restriction unit configured to restrict opening of the door by the door opening operation when detecting approach of the moving object; and a door opening permission unit configured to permit opening of the door by the door opening operation when the door opening operation is detected a predetermined number of times in a state in which the opening of the door is restricted.

BRIEF DESCRIPTION OF THE DRAWINGS

FIG. 7 is a flowchart illustrating a procedure of door opening safety control in a modified example.

MODES FOR CARRYING OUT THE INVENTION

One embodiment of a vehicle door apparatus will now be described with reference to the drawings.

Figure 1:
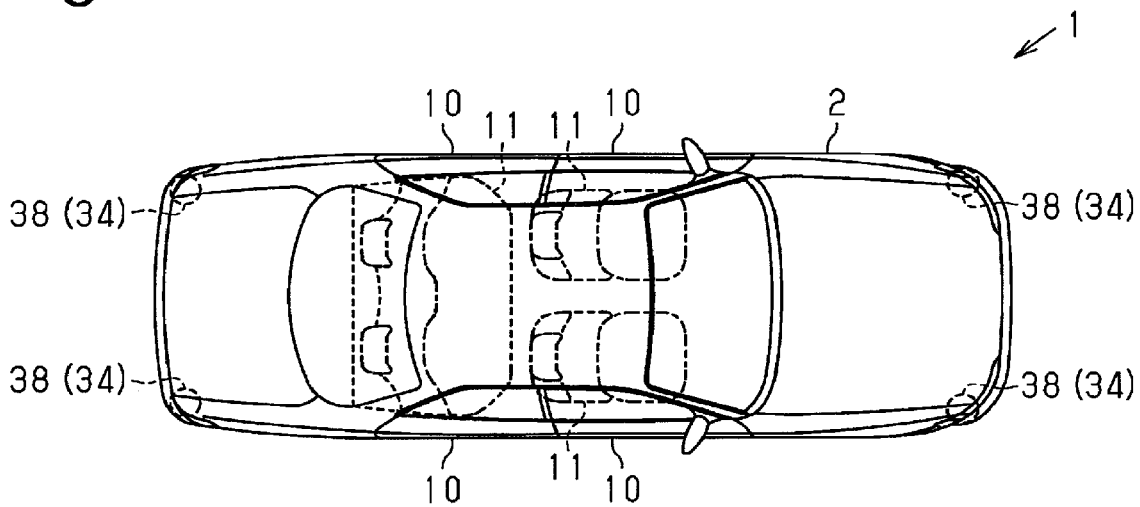
FIG. 1 is a plan view of a vehicle.
Figure 2:
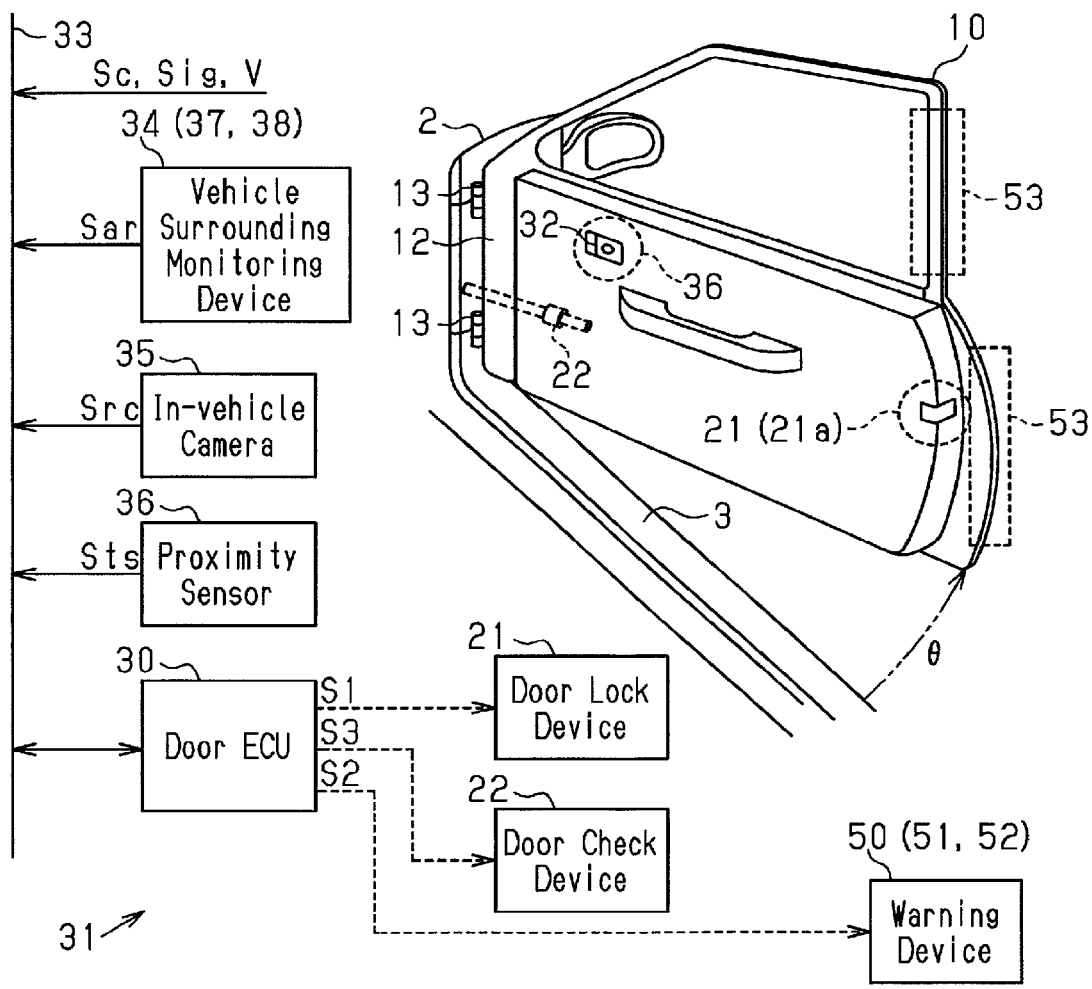
FIG. 2 is a schematic block diagram of a vehicle door apparatus of the vehicle in FIG. 1.

As shown in FIGS. 1 and 2, a vehicle 1 of the present embodiment has a four-door sedan structure. Specifically, the vehicle 1 includes four doors 10 that open and close door openings 3 in side surfaces of a vehicle body 2. The vehicle 1 in the present embodiment is configured such that the doors 10 open and close beside corresponding seats 11 arranged in a passenger compartment of the vehicle.

Specifically, in the vehicle 1 of the present embodiment, each door 10 has a swing door structure. That is, the door 10 includes a front end 12 supported by hinges 13 on the vehicle body 2. Each door 10 is configured to pivot about the hinges 13 in order to open and close the door opening 3 at the position where the door 10 is located.

Further, as shown in FIG. 2, each door 10 of the present embodiment includes a door lock device 21 configured to prohibit opening of the door 10 and a door check device 22 configured to control an opening degree of the door 10, namely, an opening angle θ of the door 10, which is structured as a swing door. Further, in the door 10 of the present embodiment, a door ECU 30 controls actuation of the door lock device 21 and the door check device 22. This configures a door control device 31 that controls opening and closing of each door 10 in the present embodiment.

Specifically, the door lock device 21 of the present embodiment is configured to release a latch mechanism 21a, which confines the door 10 to a fully closed position, from an engagement state when one of an inside door handle 32 and an outside door handle (not shown) arranged in the door 10 is operated. Further, in the vehicle 1 of the present embodiment, the door ECU 30 receives an operation input signal Sc through an in-vehicle network 33. The operation input signal Sc indicates an operation input to an operation input unit (not shown) arranged in the door 10 or a portable device (electronic key). The door ECU 30 of the present embodiment controls the actuation of the door lock device 21 based on the operation input signal Sc.

The door lock device 21 of the present embodiment, when controlled by the door ECU 30, shifts to a lock state that does not release the latch mechanism 21a from an engagement state even when the door handle performs an operation input. Further, the door lock device 21, when controlled by the door ECU 30, is configured to shift to an unlock state that permits the latch mechanism 21a to be released from an engagement state when the door handle is operated.

The door lock device 21 of the present embodiment also shifts to the lock state when a cylinder key (not shown) arranged in the door 10 is operated. Further, the door lock device 21 is configured to shift to the unlock state when the cylinder key is operated in a direction that is reverse to the door lock operation.

The door ECU 30 of the present embodiment receives a vehicle state quantity such as a vehicle speed V and an ignition signal Sig. The door ECU 30 of the present embodiment is configured to perform automatic control such as control shifting the door lock device 21 of the door 10 to the lock state, for example, if the vehicle speed V exceeds a predetermined speed.

Further, the door ECU 30 of the present embodiment receives an output signal Sar of a vehicle surrounding monitoring device 34 monitoring the surroundings of the vehicle 1, an output signal Src of an in-vehicle camera 35, an output signal Sts of a proximity sensor 36 installed in each door 10, and the like. The door ECU 30 of the present embodiment is configured to control actuation of the door lock device 21 and the door check device 22 based on the output signals of the various devices and the above vehicle state quantity.

Figure 3:
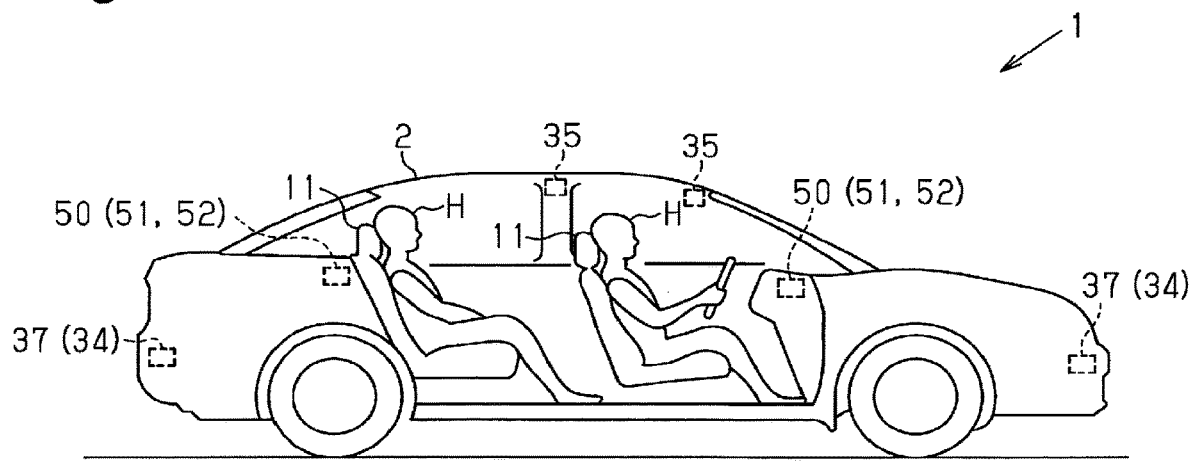
FIG. 3 is a schematic diagram showing vehicle surrounding monitoring devices, a warning device, and in-vehicle cameras arranged in the vehicle in FIG. 1, and occupants in the vehicle.

Specifically, as shown in FIG. 3, the vehicle surrounding monitoring devices 34 of the vehicle 1 in the present embodiment includes radar devices 37 that monitor the front and rear of the vehicle 1. The in-vehicle cameras 35 are installed on the ceiling in the passenger compartment of the vehicle. Further, as shown in FIG. 1, the vehicle surrounding monitoring devices 34 of the vehicle 1 in the present embodiment includes a corner sensor 38 arranged on each corner of the vehicle body 2 to detect an object approaching the corner.

Further, the door ECU 30 of the present embodiment detects an obstacle of the opening door 10 based on the output signal Sar of the vehicle surrounding monitoring device 34 and the output signal Sts of the proximity sensor 36. The door ECU 30 is configured to control the actuation of the door check device 22 and restrict the opening angle θ of the door 10 in order to avoid contact with the obstacle.

Door Opening Safety Control

The door opening safety control performed by the door ECU 30 of the present embodiment will now be described.

Figure 4:
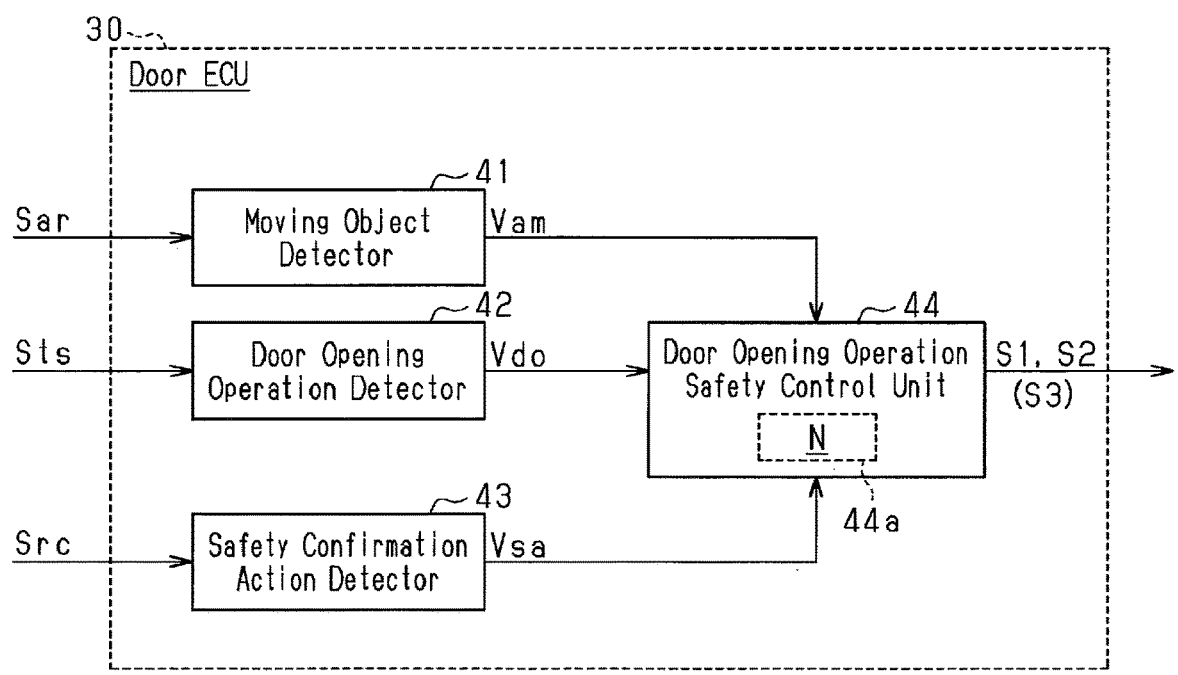
FIG. 4 is a control block of the vehicle door apparatus in FIG. 2.

As shown in FIG. 4, the door ECU 30 of the present embodiment includes a moving object detector 41 that detects a moving object approaching the door 10 of the vehicle, such as another vehicle or a motorcycle passing by the side of each door 10 based on an output signal Sar of the vehicle surrounding monitoring device 34. The door ECU 30 also includes a door opening operation detector 42 that detects a door opening operation performed to open the door 10 by an occupant H (see FIG. 3) seated on the seat 11 located beside the door 10 in the vehicle based on an output signal Sts of the proximity sensor 36 (see FIG. 2) arranged near the inside door handle 32. The door ECU 30 also includes a safety confirmation action detector 43 that detects a safety confirmation action performed by the occupant H when performing a door opening operation, for example, an action for checking the situation around the vehicle, such as looking toward the rear, based on an output signal Src of the in-vehicle camera 35, in detail, a captured image of the occupant H performing the door opening operation. The door ECU 30 of the present embodiment also includes a door opening operation safety control unit 44 that controls the actuation of the door lock device 21, restricts opening of the door 10 when a door opening operation is performed, and permits opening of the door 10 based on detection results Vam, Vdo, and Vsa of the detectors (41 to 43) so that the occupant H in the vehicle can safely perform a door opening operation.

In particular, the door opening operation safety control unit 44 of the present embodiment restricts opening of the door 10 based on a door opening operation performed by the occupant H in the vehicle if the moving object detector 41 detects an approaching moving object. Specifically, the door opening operation safety control unit 44, which serves as a door opening restriction unit, generates a control signal S1 output by the door ECU 30 to the door lock device 21 in order to shift the door lock device 21 of the door 10 to the lock state. The door control device 31 of the present embodiment prohibits opening of the door 10 in response to the control signal S1. In other words, the door control device 31 is configured not to open the door 10 even if the occupant H operates the inside door handle 32 in the vehicle to avoid contact with a moving object approaching the door 10.

Further, even in a state in which a moving object approaching the door 10 is detected, that is, in a state in which opening of the door 10 is restricted, if door opening operations are detected a predetermined number of times, the door opening operation safety control unit 44 permits opening of the door 10 based on the door opening operations of the occupant H in the vehicle. That is, the door opening operation safety control unit 44 serving as a door opening permission unit generates a control signal S1 output by the door ECU 30 to the door lock device 21 in order to shift the door lock device 21 of the door 10 to an unlock state. The door control device 31 of the present embodiment is configured to cancel the opening restriction and smoothly open the door 10 while ensuring a high level of safety when the occupant H in the vehicle considers that there is a need to perform a door opening operation.

The door ECU 30 including the moving object detector 41, the door opening operation detector 42, the safety confirmation action detector 43, and the door opening operation safety control unit 44 may be configured as a circuit that includes 1) one or more dedicated hardware circuits such as an ASIC, 2) one or more processors operated by computer programs (software), or 3) a combination thereof. The processor includes a CPU and a memory such as RAM, ROM, and the like. The memory stores program codes or instructions configured to have the CPU execute a process. The memory, namely, a computer readable medium, includes any type of available media that can be accessed by a versatile or dedicated computer.

Figure 5:
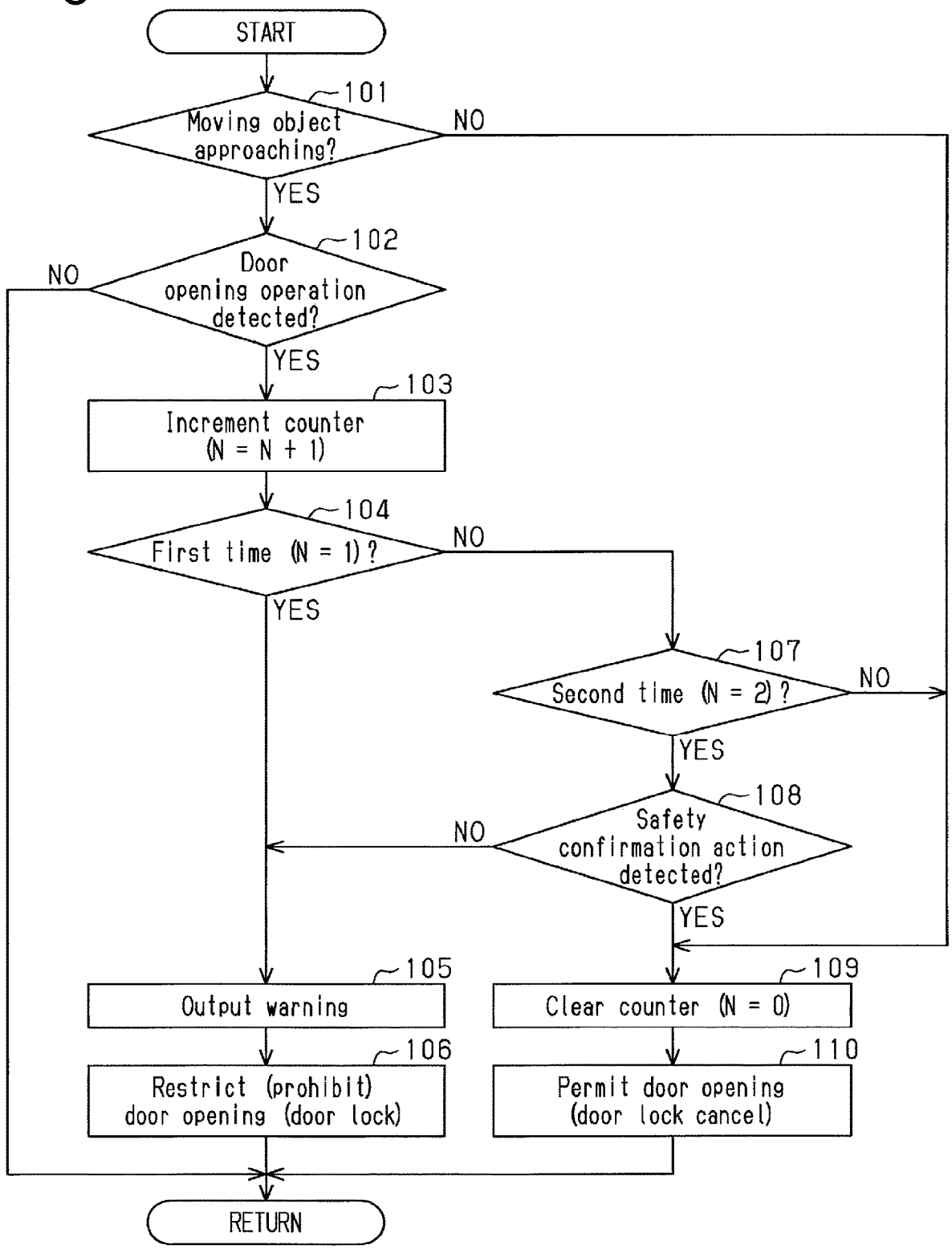
FIG. 5 is a flowchart illustrating a procedure of door opening safety control performed by the vehicle door apparatus in FIG. 2.

Specifically, as shown in the flowchart of FIG. 5, the door opening operation safety control unit 44 of the door ECU 30 in the present embodiment determines from a detection result Vam of the moving object detector 41 whether a moving object is approaching the door 10 of the vehicle (step 101). The door opening operation safety control unit 44 also determines from a detection result Vdo of the door opening operation detector 42 whether a door opening operation performed by the occupant H in the vehicle has been detected (step 102). Further, the door opening operation safety control unit 44 includes a counter 44a that measures the number of detections (see FIG. 4). If the door opening operation safety control unit 44 of the present embodiment determines that a moving object is approaching the door 10 (step 101: YES) and detects that a door opening operation has been performed by the occupant H in the vehicle (step 102: YES), the door opening operation safety control unit 44 increments the counter 44a (N=N+1, step 103).

Then, the door opening operation safety control unit 44 determines whether the door opening operation is performed by the occupant H for the "first time," that is, whether a detection number N is "1" (step 104). If the detection number N of the door opening operations is "1" (N=1, step 104: YES), the door opening operation safety control unit 44 outputs a warning indicating that a moving object is approaching the door 10 (step 105) and shifts the door lock device 21 to the lock state to prohibit opening of the door 10 (door lock, step 106).

As shown in FIGS. 2 and 3, the vehicle 1 of the present embodiment includes a loudspeaker 51, an indicator 52 and the like, each of which serves as a warning device 50 at the front portion and the rear portion inside the vehicle. The door opening operation safety control unit 44 of the present embodiment is configured to function as a warning output unit that performs a warning output when restricting the opening of the door 10 by generating a control signal S2 output by the door ECU 30 to each warning device 50.

Further, as shown in FIG. 5, if the door opening operation safety control unit 44 of the present embodiment determines that the detection number N of the door opening operations is not "1" in step 104 above (step 104: NO), the door opening operation safety control unit 44 then determines whether the door opening operation is being performed by the occupant H for the "second time," that is, whether the detection number N is "2" (step 107). Further, if the detection number N of the door opening operations is "2" in step 107 (N=2, step 107: YES), the door opening operation safety control unit 44 determines from a detection result Vsa of the safety confirmation action detector 43 whether a safety confirmation action taken by the occupant H performing the door opening operation has been detected (step 108). If the door opening operation safety control unit 44 determines that a safety confirmation action taken by the occupant H has been detected (step 108: YES), the door opening operation safety control unit 44 clears the counter 44a (N=0, step 109) and shifts the door lock device 21 to the unlock state, thereby permitting opening of the door 10 when the occupant H performs a door opening operation (door lock cancel, step 110).

If the door opening operation safety control unit 44 of the present embodiment determines that a safety confirmation action taken by the occupant H has not been detected in step 108 (step 108: NO), the door opening operation safety control unit 44 executes the processes of steps 105 and 106 in the same manner as when determining in step 104 that the door opening operation has been performed for the "first time" (step 104: YES). Thus, the door opening operation safety control unit 44 continues to output a warning and restricts (prohibits) opening of the door 10.

Even in a state in which a moving object approaching the door 10 is detected, that is, in a state in which opening of the door 10 is restricted, the door opening operation safety control unit 44 of the present embodiment permits opening of the door 10 if the detection number N of the door opening operations reaches "2," which is set in advance as a "first predetermined number," on condition that a safety confirmation action taken by the occupant H performing the door opening operation has been detected. In other words, the door opening operation safety control unit 44 is configured to permit opening of the door 10 if the detection number N is greater than or equal to the "first predetermined number" and less than a "second predetermined number" ("2" in the present embodiment) on condition that a safety confirmation action has been detected. With this structure, the door control device 31 of the present embodiment improves convenience while ensuring a high level of safety.

If the door opening operation safety control unit 44 of the present embodiment determines that the detection number N of the door opening operations is not "2" in step 107 (step 107: NO), that is, if the detection number N reaches "3," which is set in advance as the "second predetermined number," the door opening operation safety control unit 44 does not perform step 108, which is described above. The door opening operation safety control unit 44 is configured to permit opening of the door 10 based on door opening operations performed by the occupant H by executing steps 109 and 110. In other words, the door opening operation safety control unit 44 is configured to permit opening of the door 10 if the detection number N is greater than or equal to the "second predetermined number" ("3" in the present embodiment) even if a safety confirmation action is not detected.

Further, if the door opening operation safety control unit 44 determines that a door opening operation performed by the occupant H in the vehicle has not been detected in step 102, which is described above (step 102: NO), the door opening operation safety control unit 44 does not execute the processes from step 103. The door opening operation safety control unit 44 is configured to execute steps 109 and 110, which are described above, without executing processes of steps 102 to 108 if the door opening operation safety control unit 44 determines that there is no approaching moving object in step 101, which is described above (step 101: NO).

The present embodiment has the following advantages.

(1) The door ECU 30 includes the moving object detector 41 that detects a moving object approaching the door 10 of the vehicle and the door opening operation detector 42 that detects a door opening operation performed by the occupant H in the vehicle. The door ECU 30 also includes the door opening operation safety control unit 44 that restricts or permits opening of the door 10 when a door opening operation is performed by the occupant H in the vehicle based on the detection results Vam and Vdo of the moving object detector 41 and the door opening operation detector 42. Specifically, the door opening operation safety control unit 44, which serves as the door opening restriction unit, restricts opening of the door 10 based on door opening operations performed by the occupant H in the vehicle if a moving object approaching the door 10 is detected. The door opening operation safety control unit 44, which serves as the door opening permission unit, permits opening of the door 10 based on door opening operations performed by the occupant H in the vehicle if the predetermined number of door opening operations is detected even in a state in which a moving object approaching the door 10 is detected, that is, in a state in which opening of the door 10 is restricted.

The above configuration ensures a high level of safety by avoiding contact between the door 10 of the vehicle when opening and a moving object approaching the door 10, while easily canceling the opening restriction so that the occupant H in the vehicle can smoothly open the door 10 when necessary. This improves convenience for the occupant H.

(2) The door ECU 30 includes the safety confirmation action detector 43 that detects a safety confirmation action performed by the occupant H in the vehicle. In a state in which an approaching moving object is detected, that is, when opening of the door 10 is restricted, the door opening operation safety control unit 44 permits opening of the door 10 if the detection number N of door opening operations performed by the occupant H in the vehicle reaches "2," which is set in advance as the "first predetermined number," on condition that a safety confirmation action taken by the occupant H performing the door opening operation has been detected. If the detection number N of the door opening operations performed by the occupant H in the vehicle reaches "3," which is set in advance as the "second predetermined number" that is greater than the first predetermined number (2), the door opening operation safety control unit 44 permits opening of the door 10 by a door opening operation even if a safety confirmation action taken by the occupant H has not been detected. This further improves convenience for the occupant H while ensuring a high level of safety.

The embodiment may be modified as described below.

The above embodiment is incorporated in the door control device 31 of the vehicle 1 (four-door sedan) that includes four swing doors as the doors 10. Instead, the embodiment may be applied to a vehicle that includes other type of doors 10 such as sliding doors and gull-wing doors. Further, the vehicle may be of any type, and the number and arrangement of the doors 10 may be changed in any manner.

The above embodiment uses the radar device 37 and the corner sensors 38 as the vehicle surrounding monitoring device 34 that detects a moving object approaching the door 10 of the vehicle. Instead, the vehicle surrounding monitoring device 34 and the moving object detector 41 may be changed in any manner. For example, image analysis may be performed using a camera or the like.

The above embodiment detects a door opening operation performed by the occupant H in the vehicle based on the output signal Sts of the proximity sensor 36 arranged near the inside door handle 32. Instead, the door opening operation detector 42 may be changed in any manner. For example, image analysis may be performed using a camera or the like.

In the above embodiment, the door opening operation safety control unit 44, which serves as the door opening restriction unit, restricts (prohibits) opening of the door 10 by controlling the door lock device 21, which is arranged in the door 10 of the vehicle, in a lock state. Instead, door opening may be restricted by controlling the actuation of the door check device 22 to restrict the opening angle θ of the door 10, namely, an opening degree of the door 10. Specifically, in this case, the door opening operation safety control unit 44 generates a control signal S3 output by the door ECU 30 to the door check device 22 (see FIGS. 1 and 4). Preferably, the opening degree restriction imposed on the door 10 in this case is set so that the occupant H cannot exit from the door 10. This has the same advantages as the above embodiment.

Further, an indicator 53 may be arranged at the rear end of the door 10 as shown in FIG. 2. If the door 10 opens in a state in which the opening degree (opening angle θ) is restricted as described above, the indicator 53 is illuminated to issue a vehicle exterior warning output toward the outside of the vehicle 1.

More specifically, illumination of an indicator 53 warns the driver of a moving object approaching the door 10 from behind the vehicle 1 that the door 10 may open. This ensures a higher level of safety. The vehicle exterior warning output toward the outside of the vehicle 1 may be issued in any manner by, for example, generating noise from an external loudspeaker or by illuminating or changing an illuminating pattern of a blinker, a tail lamp, or a fog lamp. This allows for application to doors 10 that are not swing doors, and a vehicle exterior warning may be output toward a moving object approaching the front of the vehicle 1.

When determined that a safety confirmation action performed by the occupant H has not been detected, the warning output and opening restriction (door lock) of the door 10 are performed in the same manner as when determined that a door opening operation is performed for the "first time" in the above embodiment. The opening restriction imposed on the door 10 may differ between the first door opening operation and the second door opening operation. Further, the warning output may differ between the first door opening operation and the second door opening operation.

Figure 6:
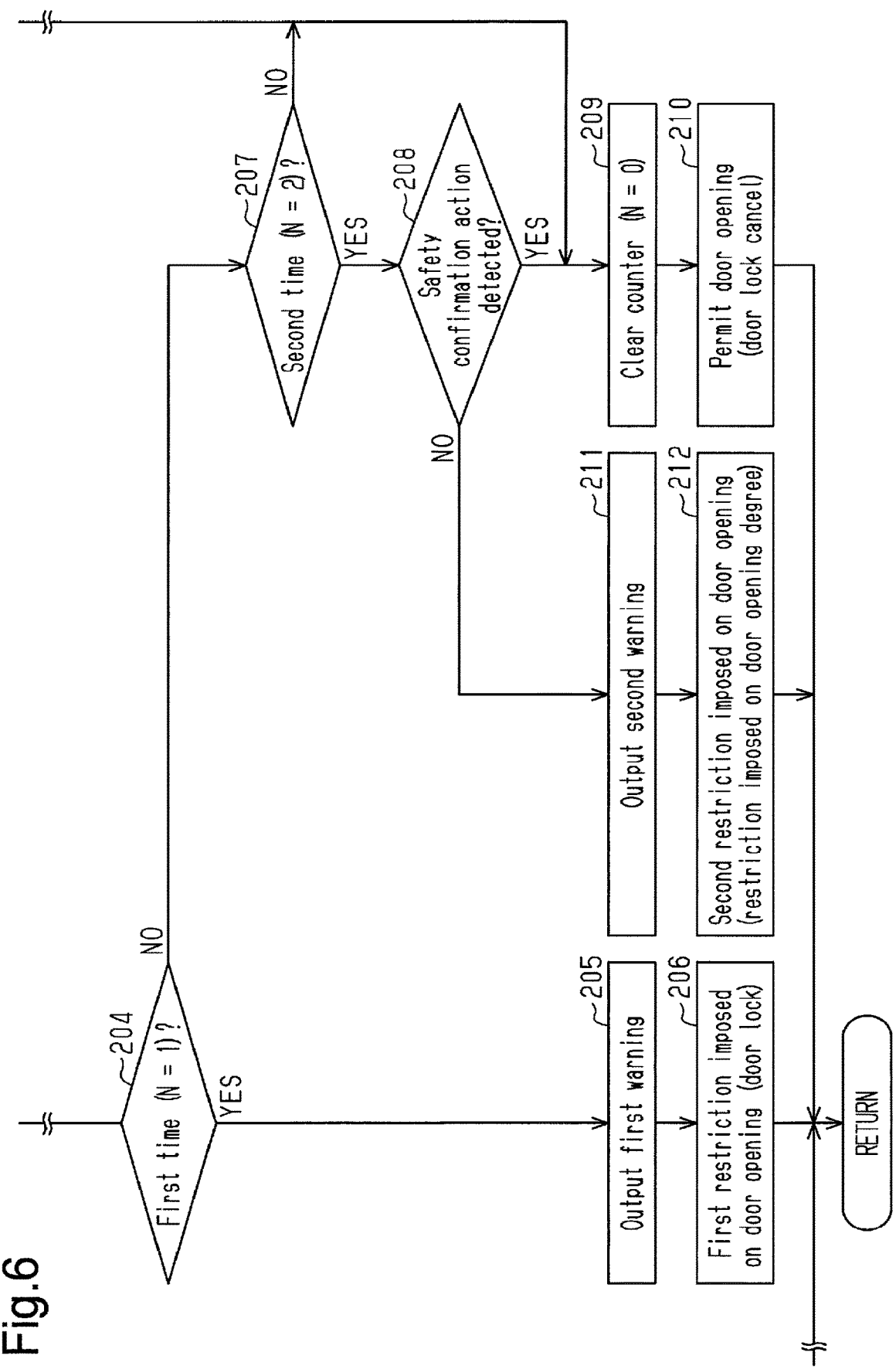
FIG. 6 is a flowchart illustrating a procedure of door opening safety control in a modified example.

For example, as shown in FIG. 6, the content of a warning output in the first door opening operation (step 204: YES) may be set to be moderate (first warning output, step 205). In this case, opening of the door 10 is prohibited (first restriction imposed on door opening, step 206) by controlling the door lock device 21 in the lock state in the same manner as the above embodiment. In contrast, a warning output performed in the second door opening operation (step 208: NO) may be set to have a stronger warning content (second warning output, step 211). In this case, door opening may be restricted by controlling the actuation of the door check device 22 to restrict the opening degree (opening angle θ) as in the above modified example (second restriction imposed on door opening, step 212).

The processes of steps 201 to 204 (only steps after step 203 shown) in the flowchart of FIG. 6 are the same as the processes of steps 101 to 104 in the flowchart of FIG. 5 illustrating the procedure of the above embodiment. The processes of steps 207 to 210 in the flowchart of FIG. 6 are the same as the processes of steps 107 to 110 in the flowchart of FIG. 5.

In this example, the door opening operation safety control unit 44, which serves as the door opening restriction unit, functions as a door opening prohibiting unit that prohibits opening of the door 10 until the detection number N of the door opening operations reaches a predetermined switching number (2), that is, if the detection number N is less than the predetermined switching number (2) (first time). The door opening operation safety control unit 44 further functions as a door opening degree restricting unit that restricts the opening degree of the door 10 after the detection number N reaches the switching number, that is, if the detection number N is greater than or equal to the predetermined switching number (2) (second time). Such a configuration is employed to further effectively inform the occupant of a moving object approaching the door 10 and urge the occupant to pay attention to the moving object. This ensures a higher level of safety.

In the above embodiment, the "first predetermined number" is set to "2" and the "second predetermined number" is set to "3" regarding the detection number N of door opening operations performed by the occupant H in the vehicle in a state in which a moving object approaching the door 10 is detected, that is, opening of the door 10 is restricted. If the detection number N reaches "the first predetermined number," the opening of the door 10 is permitted on condition that a safety confirmation action taken by the occupant H performing the door opening operation has been detected. If the detection number N reaches the "second predetermined number," the opening of the door 10 based on the door opening operation is permitted even if a safety confirmation action taken by the occupant H has not been detected.

Instead, the "first predetermined number" and the "second predetermined number" may be changed in any manner. In this case, the "second predetermined number" is set to be greater than the "first predetermined number." Further, when switching the opening restriction imposed on the door 10 like in the modified example shown in the flowchart of FIG. 6, the "switching number" may differ from the "first predetermined number." Opening of the door 10 may be permitted on condition that door opening operations are detected a predetermined number of times and a safety confirmation action taken by the occupant H is detected, regardless of the detection number N of door opening operations.

The detection of a safety confirmation action taken by the occupant H does not necessarily have to be performed. Such a configuration also improves convenience for the occupant H while ensuring safety.

For example, as shown in the flowchart of FIG. 7, if a door opening operation is determined as having been performed for the "second time" (step 307: YES), a warning output is issued (step 308) without determining whether a safety confirmation action has been detected and opening restriction is imposed on the door 10 (step 309).

The processes of steps 301 to 307 (only steps after step 303 shown) in the flowchart of FIG. 7 are the same as the processes of steps 201 to 207 (only steps after step 203 shown in the same manner) in the flowchart of FIG. 6. The processes of steps 310 and 311 in the flowchart of FIG. 7 are the same as the processes of steps 209 and 210 in the flowchart of FIG. 6.

In this example, the warning output in step 308 (second warning output) differs from a warning output (first warning output, step 305) when a door opening operation is performed for the "first time" (step 304: YES) in the same manner as the modified example shown in the flowchart of FIG. 6. The opening restriction imposed on the door 10 in step 309 (second restriction imposed on door opening: door opening degree restriction) also differs from the opening restriction when the door opening operation is performed for the "first time" (first restriction imposed on door opening: door lock, step 306).

Further, until the detection number N of the door opening operations performed by the occupant H reaches a predetermined number of times (three times, for example) corresponding to the "second predetermined number" in the above embodiment, that is, if the detection number N of the door opening operations is less than the "second predetermined number," the warning output and opening restriction (door lock) of the door 10 may be the same as when the door opening operation is performed for the "first time," and determination of whether a safety confirmation action has been performed does not have to be detected. When the detection number N of the door opening operations reaches the number of times (three times, for example) corresponding to the "second predetermined number," opening of the door 10 by a door opening operation may be permitted in an unconditional manner.

Figure 8:
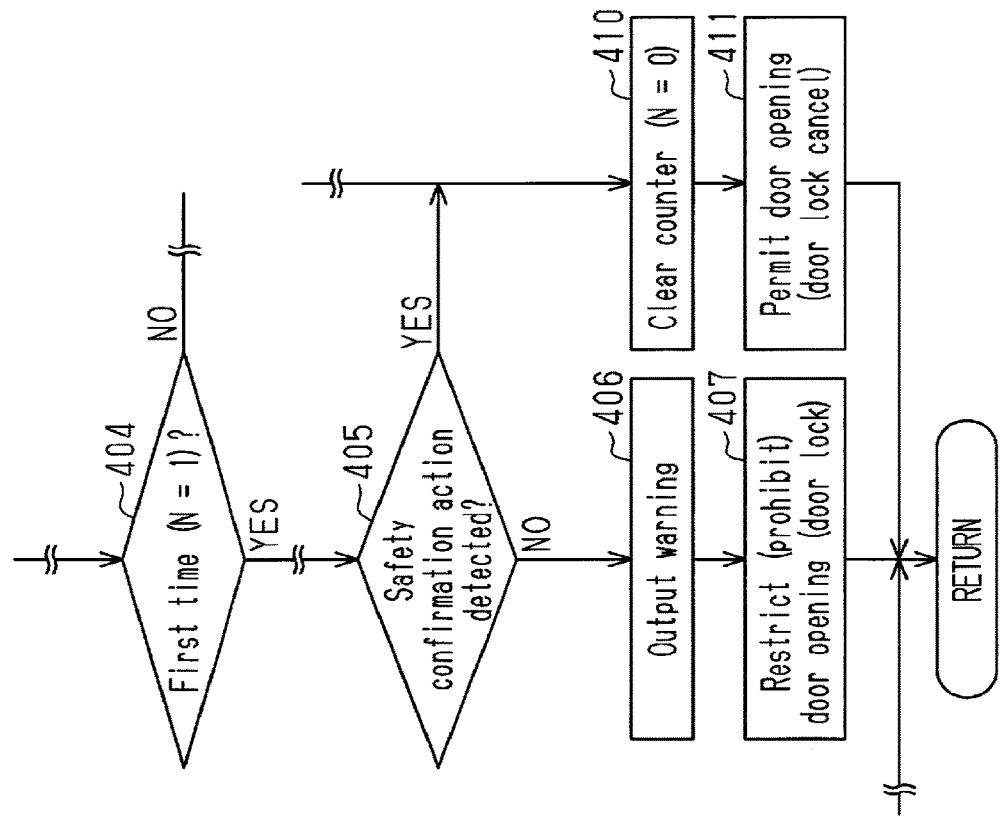
FIG. 8 is a flowchart illustrating a procedure of door opening safety control in a modified example.

Further, as shown in the flowchart of FIG. 8, if the detection number N of the door opening operations performed by the occupant H in the vehicle is "1" (step 404: YES), it is determined whether a safety confirmation action has been detected (step 405). If a safety confirmation action has been detected (step 405: YES), the counter 44a is cleared (N=0, step 410) and the opening of the door 10 by a door opening operation of the occupant H is permitted (step 411) even if the detection number N of the door opening operations is "1."

The processes of steps 401 to 404 (only steps after step 403 shown) in the flowchart of FIG. 8 are the same as the processes of steps 101 to 104 in the flowchart of FIG. 5 showing the procedure of the above embodiment. The processes from step 406 in the flowchart of FIG. 8 are the same as the processes from step 105 in the flowchart of FIG. 5.

Figure 9:
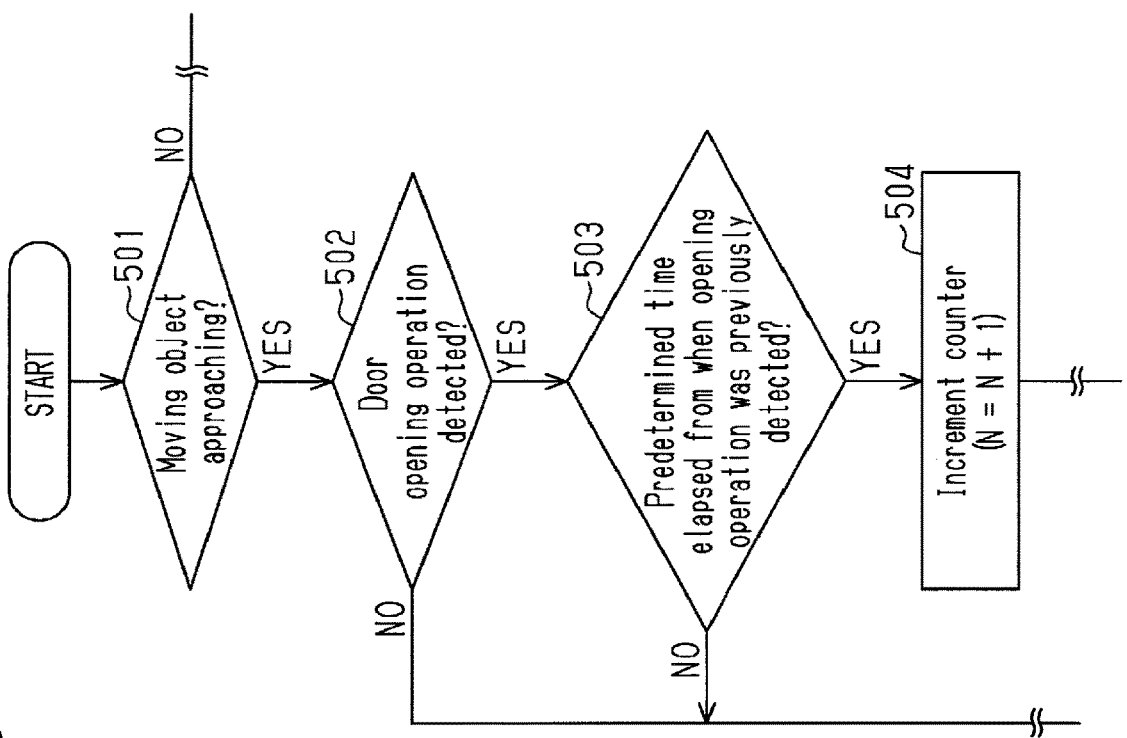
FIG. 9 is a flowchart illustrating a procedure of door opening safety control in a modified example.

Further, as shown in the flowchart of FIG. 9, in a state in which an approaching moving object is detected, that is, opening of the door 10 is restricted (step 501: YES), if a door opening operation performed by the occupant H in the vehicle is detected (step 502: YES), it is determined whether a predetermined time has elapsed from when a door opening operation was previously detected (step 503). If a new door opening operation is detected after the predetermined time has elapsed since the preceding door opening operation was detected (step 503: YES), the counter 44a measuring the number of a detections may be incremented (step 504).

The processes from step 505 may be the same as the processes from step 104 in the flowchart of FIG. 5 showing the procedure of the above embodiment. Alternatively, the processes from step 505 may be the same as the processes from step 204 in the flowchart of FIG. 6, the processes from step 304 in the flowchart of FIG. 7, or the processes from step 404 in the flowchart of FIG. 8 showing the procedure of the modified example.

With this configuration, the opening restriction imposed on the door 10 is maintained even if the occupant H in the vehicle repeatedly performs door opening operations within a short time period to quickly open the door 10. In other words, the configuration calms down the occupant H performing the door opening operations in order to effectively inform that a moving object is approaching the door 10 and urge the occupant H to pay attention to the moving object. This ensures a higher level of safety.

The invention claimed is:

1. A vehicle door apparatus comprising:
   a moving object detector configured to detect a moving object approaching a door of a vehicle;
   a door opening operation detector configured to detect a door opening operation performed by an occupant in the vehicle;
   a door opening restriction unit configured to restrict opening of the door by the door opening operation when detecting approach of the moving object;
   a door opening permission unit configured to permit opening of the door by the door opening operation when the door opening operation is detected a predetermined number of times in a state in which the opening of the door is restricted; and
   a safety confirmation action detector configured to detect a safety confirmation action taken by the occupant, wherein
   the door opening permission unit is configured to permit opening of the door on condition that the safety confirmation action has been detected,
   the door opening permission unit is configured to permit opening of the door when a detection number of the door opening operation is greater than or equal to a first predetermined number and less than a second predetermined number that is greater than the first predetermined number on condition that the safety confirmation action has been detected, and
   the door opening permission unit is configured to permit opening of the door even if the safety confirmation action has not been detected when the detection number of the door opening operation is greater than or equal to the second predetermined number.

2. The vehicle door apparatus according to claim 1, wherein the door opening restriction unit includes
- a door opening prohibiting unit configured to prohibit opening of the door when a detection number of the door opening operation is less than a predetermined switching number, and
- a door opening degree restricting unit configured to restrict an opening degree of the door when the detection number of the door opening operation is greater than or equal to the predetermined switching number.

3. The vehicle door apparatus according to claim 1, comprising a counter that measures a detection number of the door opening operation, wherein the counter is configured to increment the detection number when the door opening operation is newly detected after a predetermined time elapses from when the door opening operation was previously detected.

4. The vehicle door apparatus according to claim 1, comprising a warning output unit configured to issue a warning output when the door opening operation is detected in a state in which opening of the door is restricted.

5. The vehicle door apparatus according to claim 4, wherein the warning output includes a vehicle exterior warning output directed outward from the vehicle.

* * * * *